United States Patent [19]

Nyezdatny

[11] Patent Number: 5,217,098
[45] Date of Patent: Jun. 8, 1993

[54] APPARATUS FOR INTEGRATING TRANSMISSION CONTROL AND BRAKE CONTROL

[75] Inventor: Mark Nyezdatny, Temple City, Calif.

[73] Assignee: Adams Rite Manufacturing Company, City of Industry, Calif.

[21] Appl. No.: 962,684

[22] Filed: Oct. 19, 1992

[51] Int. Cl.⁵ ............................................ B60K 41/26
[52] U.S. Cl. .................. 192/4 A; 74/473 R; 192/4 C
[58] Field of Search ............ 192/4 R, 4 A, 4 C; 74/473 R

[56] References Cited

U.S. PATENT DOCUMENTS

| | | |
|---|---|---|
| 3,082,638 | 3/1963 | Nilson . |
| 3,361,234 | 1/1968 | Runyon . |
| 4,358,965 | 11/1982 | Schroeder . |
| 4,370,897 | 2/1983 | Carlo . |
| 4,709,793 | 12/1987 | Sakakibara et al. . |
| 4,875,563 | 10/1989 | Larson et al. ................... 192/4 A |
| 5,042,316 | 8/1991 | Gressett, Jr. . |

Primary Examiner—Richard M. Lorence
Attorney, Agent, or Firm—William W. Haefliger

[57] ABSTRACT

A transmission control system wherein a selector is movable between multiple positions to control the transmission, there also being brake structure having ON and OFF positions, and a valve unit to control application of pressurized fluid to the brake structure to effect brake movement between the ON and OFF positions, an actuator for the transmission movable between multiple positions corresponding to the selector positions; structure operatively connected with the actuator, the selector and the valve unit to i) cause the valve unit to pass fluid pressure transmission to the brake structure when the selector is in a first position, and ii) cause the valve unit to block fluid pressure transmission to the brake structure when the selector is in at least one other of the multiple positions.

9 Claims, 3 Drawing Sheets

APPARATUS FOR INTEGRATING TRANSMISSION CONTROL AND BRAKE CONTROL

BACKGROUND OF THE INVENTION

This invention relates generally to transmission systems and braking systems, and more particularly concerns relating the operation of a braking system to the operation of a transmission system to integrate these so as to enable their joint operation in response to movement of a single selector, the latter, for example, being manually operable.

There is a need for simplified integration of transmission control systems and braking systems, as for example on vehicles, such as trucks. For example, it is desired that the truck wheel brakes be applied when the transmission control system is in a second "N" (neutral) position; and wherein the brakes are released when the transmission control system is in other positions, as for example drive, first, neutral, and reverse positions, or any one of these. In particular, there is need for simplification of the integration and integrated operation of such braking and transmission control systems, to assure safe and coordinated operation thereof, enhancing safety and ease of operator control.

SUMMARY OF THE INVENTION

It is a major object of the invention to provide an improved system meeting the above needs. In particular, it is an object to provide for an integrated brake operating system and transmission operating system, whereby it is assured that the brakes will be applied when the transmission control system is in one position and the brakes will not be applied when the transmission control system is in certain other positions, as will appear.

Basically, the invention is embodied in a transmission control system wherein a selector is movable between multiple positions to control the transmission, there also being brake means having ON and OFF positions, and a valve unit to control application of pressurized fluid, such as compressed gas or hydraulic fluid or liquid, to the brake means to effect brake movement between the ON and OFF positions. In this environment, the invention contemplates the provision of:

a) an actuator for the transmission movable between multiple positions corresponding to the selector positions, b) means operatively connected with the actuator, the selector and the valve unit to i) cause the valve unit to pass fluid pressure transmission to the brake means when the selector is in a first position, and ii) cause the valve unit to block fluid pressure transmission to the brake means when the selector is in at least one other of the multiple positions.

These and other objects and advantages of the invention, as well as the details of an illustrative embodiment, will be more fully understood from the following specification and drawings, in which:

DRAWING DESCRIPTION

DETAILED DESCRIPTION

Figure 1:
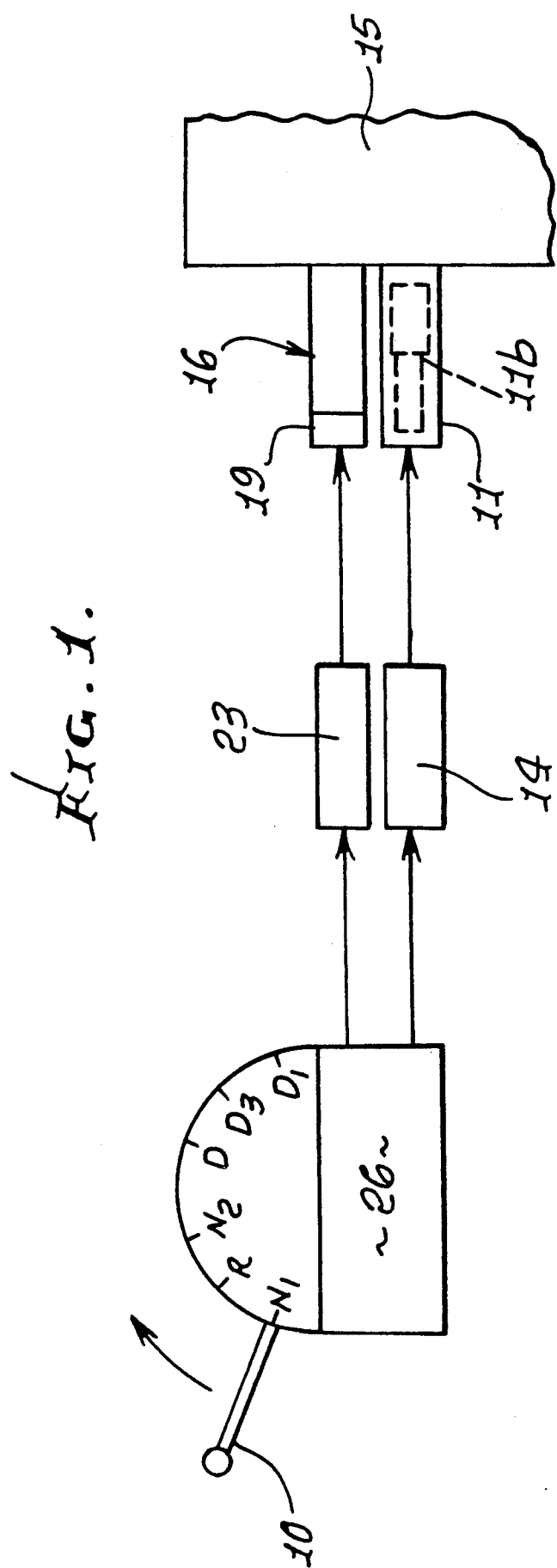
FIG. 1 is a block diagram.

In FIG. 1, a manual selector 10 is movable between multiple positions, to control a transmission 11. See also FIGS. 2 and 3, wherein selector handle 10a is carried by a box 12 and is movable in direction between multiple positions to control a transmission 11a. Such positions may include, in sequence:

$N_2$—neutral
R—reverse
$N_1$—neutral
D—drive
$D_3$—drive
$D_1$—drive

See also U.S. Pat. No. 5,042,316 showing a selector having multiple positions, and a transmission, as for a vehicle.

In FIG. 1, the transmission 11 is shown as having gears 11b, or other leverage components, to be shifted in accordance with the positioning of the selector 10. A transmission actuator is also seen at 14, for shifting such gears or leverage components. The transmission may be on a vehicle indicated schematically at 15, and as having wheel brake means Referring to FIG. 2, the brake 16a may include a shoe 17 on a wheel, a brake pad 18, and an actuator 19 to retract the pad away from the shoe 17. Spring 20 urges the pad against the shoe when the transmission is to be left in a $N_2$ position. Air or other fluid pressure application at 21 to the actuator causes the actuator to retract the pad away from the shoe, i.e., an "unbraked" condition. Pressurizing fluid at the actuator may be appropriately vented when the spring urges the pad against the shoe.

Gas, such as air pressure application (or other fluid pressure), is controlled by a valve unit 23 connected at 24 with the brake actuator 19, to effect brake movement between ON (braked) and OFF (unbraked) positions.

In accordance with the invention, means is provided, as indicated at 26, to be operatively connected with the transmission actuator 14, the selector 10, and the valve unit 23, to:

i) cause the valve unit to pass fluid pressure transmission to the brake means when the selector is in a first position, and ii) cause the valve unit to block fluid pressure transmission to the brake means when the selector is in at least one other of the multiple positions.

For example, the first position of the selector may be the $N_2$ position referred to (i.e., brake ON condition); and the other multiple positions of the selector may be the R, $N_1$, D, $D_3$, and $D_1$ positions (i.e., brake OFF condition). Accordingly, the selector controls both the transmission condition and the brake application as related to transmission condition, in a very simple and effective manner. The invention also enhances this simplicity and effectiveness through the particular means 26 to be described.

Figure 2:
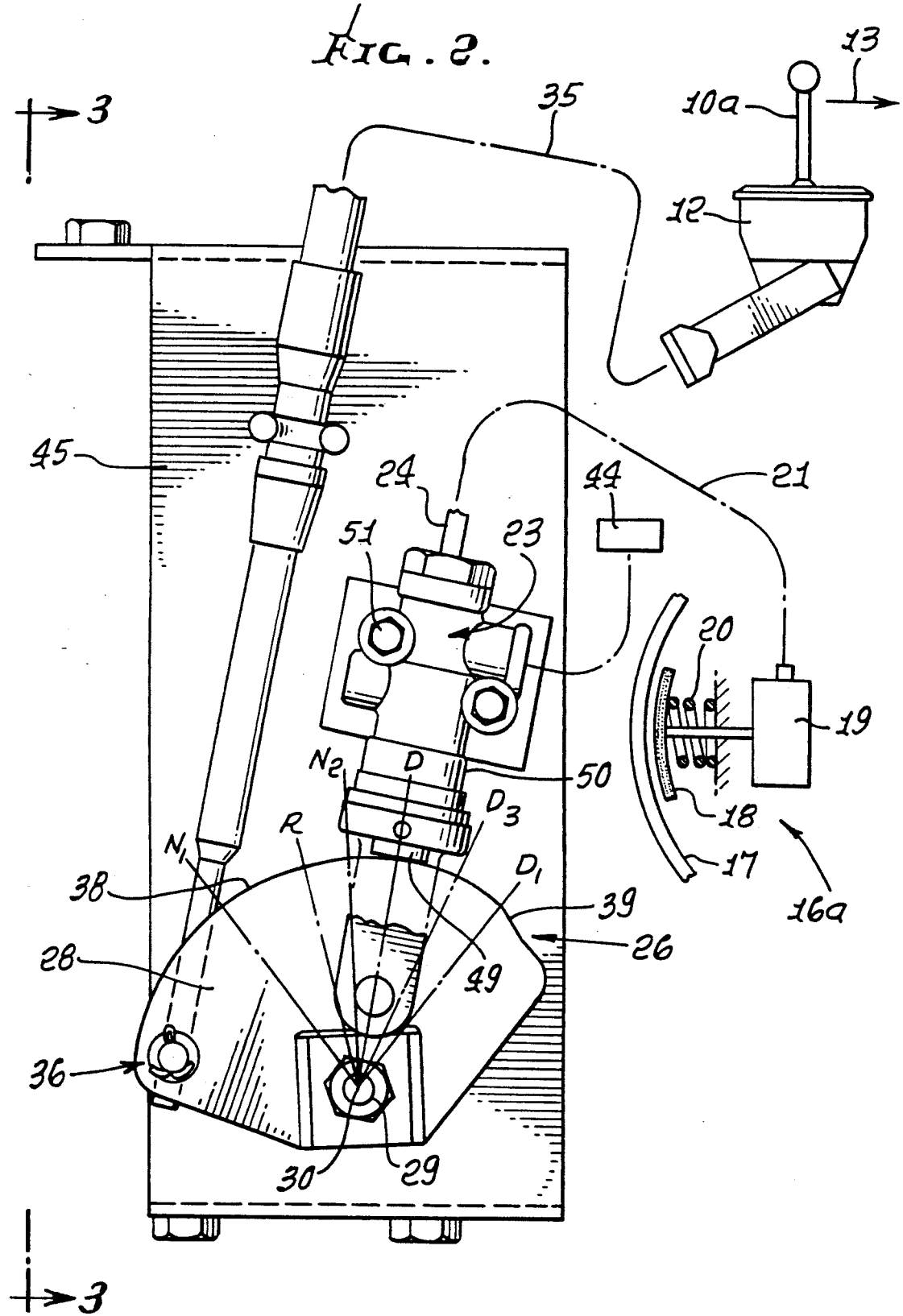
FIG. 2 is a front elevation of apparatus incorporating the invention.
Figure 3:
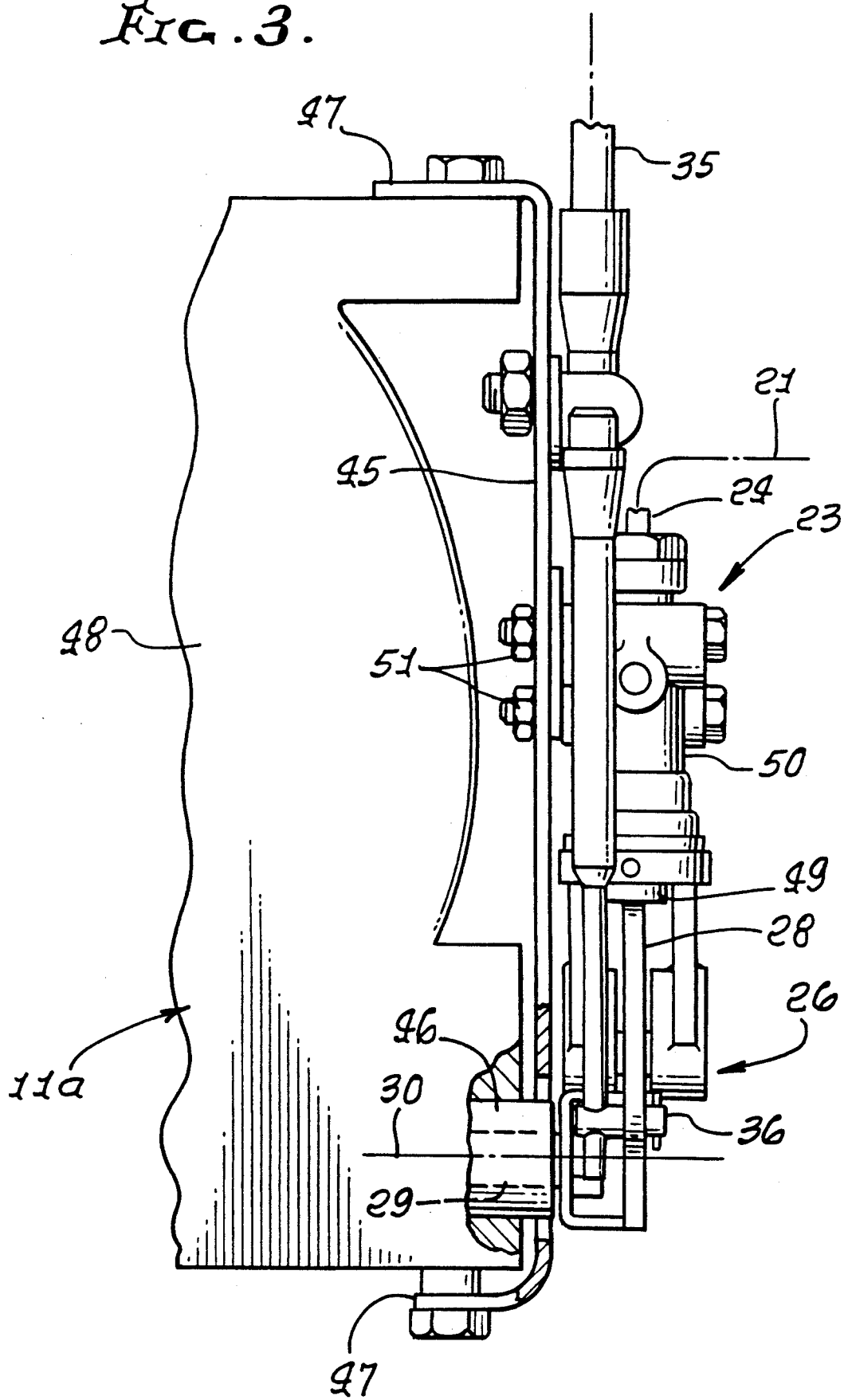
FIG. 3 is a side elevation taken on lines 3—3 of FIG. 2.

In FIGS. 2 and 3, the means 26 includes a rotary means, such as a valve operating cam 28 connected with a transmission rotary actuator shaft 29, to be rotatable with that shaft about axis 30. The rotated positions of that shaft, corresponding to transmission condition, are indicated by the letters $N_2$, R, $N_1$, D, $D_3$, and $D_1$, as shown associated with radial lines extending at different angles about axis 30. Those angles also designate different cam angles of rotation, as effected by selector 10. A linkage, such as a cable 35, connects the selector with the cam at 36, offset from axis 30, whereby selector-controlled rotation of the cam also controls corresponding rotation of the transmission actuator shaft 29, about axis 30.

The cam has a first elongated, curved, camming peripheral surface 38 spaced from axis 30 to operate the valve unit 23, as referred to; i.e., to cause the valve unit to pass fluid, such as gas or liquid, pressure to brake actuator 19, causing brake release, while the transmission actuator is moved to and between any of positions R, $N_1$, D, $D_3$, and $D_1$, as referred to. The cam also has a second, relatively short surface 39 beyond a rotary continuation of the first surface 38, and positioned to engage the valve unit, but actually effecting its actuation, i.e., so as not to cause fluid pressure transmission to brake actuator 19. Cam surface 39 engages the valve unit in selector and cam position $N_2$, at which the vehicle is parked, and the brakes are ON.

Accordingly, the selector 10 controls cam movement, which in turn controls both pressure application to the brakes, and transmission actuation (torque application by the transmission to the vehicle wheels), all in a very simple, effective manner, which is "fail safe" in the event of fluid pressure loss and/or lost motion in the system. The source of fluid pressure is indicated at 44 in FIG. 2.

Also shown in FIGS. 2 and 3 are mounting plate 45, for a bearing 46, for the shaft 29 and cam 28; connections 47 of the plate to the transmission housing 48; valve unit plunger 49 engaging surfaces 38 and 39, and which, in turn, controls valve ON and OFF conditions; valve unit housing 50; and connections at 51 to plate 45.

I claim:

1. For use in combination with a transmission having a rotary control shaft and a housing, a transmission control system wherein a selector is movable between multiple positions to control the transmission, there also being brake means having ON and OFF positions, and a valve unit to control application of pressurized fluid to the brake means to effect brake movement between said ON and OFF positions, the combination comprising:
   a) an actuator for the transmission movable between multiple positions corresponding to said selector positions,
   a) means operatively connected with said actuator, said selector and said valve unit to
      i) cause the valve unit to pass fluid pressure transmission to the brake means when the selector is in a first position, and
      ii) cause the valve unit to block fluid pressure transmission to the brake means when the selector is in at least one other of the multiple positions, said means including a rotary cam movable in response to movement of the selector between said multiple positions to rotate said actuator,
   c) said actuator comprising a shaft having a rotary axis, said cam carried to be rotatable about said axis,
   d) and including a linkage connected between said selector and said cam, the linkage operatively connected to the cam at a location spaced from said axis, the shaft operatively connected with the cam to rotate therewith, and also directly connected with the transmission,
   e) the transmission having a wall through which the shaft axis projects and the valve unit carried by the transmission wall.

2. The system of claim 1 wherein the cam has a first camming surface spaced from said axis to operate said valve unit as aforesaid, and a second surface positioned to engage the valve unit without effecting actuation thereof.

3. The system of claim 2 wherein said second surface of the cam when engaged with the valve unit has a position corresponding to a park or neutral position of the transmission actuator.

4. The system of claim 3 wherein said cam first surface is located to engage the valve unit when the transmission actuator is in any of a multiplicity of drive positions and a reverse drive position.

5. The system of claim 4 wherein said second surface is beyond a rotary continuation of said first surface.

6. The system of claim 1 wherein said cam is integrally connected with said shaft.

7. The system of claim 6 wherein said shaft is rotatable to displace the transmission between multiple positions including drive, reverse, park, and neutral positions; and said cam is rotatable with the actuator shaft and to operate the valve means in two different modes, one mode corresponding to all but one of said actuator positions, and the other mode corresponding to said one actuator position.

8. The system of claim 7 wherein said one position is an actuator park position; and in which the valve unit is operated to effect clamping of the brake means on a braked surface.

9. The system of claim 8 including a vehicle having a wheel means defining said braked surface.

* * * * *